(12) United States Patent
Kim et al.

(10) Patent No.: US 10,794,454 B1
(45) Date of Patent: Oct. 6, 2020

(54) PLANETARY GEAR TRAIN OF AN AUTOMATIC TRANSMISSION FOR A VEHICLE

(71) Applicants: HYUNDAI MOTOR COMPANY, Seoul (KR); KIA MOTORS CORPORATION, Seoul (KR)

(72) Inventors: Jin Ho Kim, Suwon-si (KR); Jae Joon Lee, Anyang-si (KR); Jong Sool Park, Hwaseong-si (KR); Kyeong Hun Lee, Seoul (KR); Jong Soo Kim, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/915,112

(22) Filed: Jun. 29, 2020

Related U.S. Application Data

(62) Division of application No. 15/960,135, filed on Apr. 23, 2018, now Pat. No. 10,731,733.

(30) Foreign Application Priority Data

Oct. 31, 2017 (KR) .......................... 10-2017-0143290

(51) Int. Cl.
| | |
|---|---|
| *F16H 3/62* | (2006.01) |
| *F16H 3/44* | (2006.01) |
| *F16H 37/06* | (2006.01) |
| *F16H 3/66* | (2006.01) |

(52) U.S. Cl.
CPC ....... *F16H 3/66* (2013.01); *F16H 2200/0069* (2013.01); *F16H 2200/2015* (2013.01); *F16H 2200/2046* (2013.01)

(58) Field of Classification Search
CPC ................. F16H 2200/2015; F16H 2200/2046
See application file for complete search history.

(56) References Cited

U.S. PATENT DOCUMENTS

| | | |
|---|---|---|
| 3,410,157 A | 11/1968 | Livezey |
| 4,178,813 A | 12/1979 | Smemo |
| 4,346,623 A * | 8/1982 | Tatsuo ...................... F16H 3/66 475/286 |
| 7,297,085 B2 * | 11/2007 | Klemen .................... F16H 3/66 475/280 |

FOREIGN PATENT DOCUMENTS

| | | |
|---|---|---|
| SU | 1597477 A1 | 10/1990 |
| SU | 1670248 A1 | 8/1991 |

* cited by examiner

*Primary Examiner* — Tisha D Lewis
(74) *Attorney, Agent, or Firm* — Lempia Summerfield Katz LLC

(57) ABSTRACT

A planetary gear train of an automatic transmission for a vehicle includes input and output shafts, and first, second, third, fourth, and fifth planetary gear sets, each including three rotational elements. The gear train also includes nine shafts for selectively connecting the planetary gear sets, the input and output shafts, and a transmission housing in various configurations to achieve at least ten forward speeds and at least one reverse speed.

8 Claims, 3 Drawing Sheets

FIG. 2

| Shift-stage | Engagement element ||||||  Gear ratio | Step ratio | Remark |
|---|---|---|---|---|---|---|---|---|---|
| | C1 | C2 | C3 | B1 | B2 | B3 | | | |
| D1 |  |  | ● |  | ● | ● | 4.420 |  | |
| | | | | | | | | 1.417 | Gear ratio span: 10.7  Gear ratio of R/D1: 1.01 |
| D2 |  | ● |  |  | ● | ● | 3.119 | | |
| | | | | | | | | 1.419 | |
| D3 | ● |  |  |  | ● | ● | 2.198 | | |
| | | | | | | | | 1.271 | |
| D4 | ● |  | ● |  | ● |  | 1.730 | | |
| | | | | | | | | 1.341 | |
| D5 | ● | ● |  |  | ● |  | 1.290 | | |
| | | | | | | | | 1.290 | |
| D6 | ● | ● | ● |  |  |  | 1.000 | | |
| | | | | | | | | 1.221 | |
| D7 | ● | ● |  |  |  | ● | 0.819 | | |
| | | | | | | | | 1.262 | |
| D8 | ● | ● |  | ● |  |  | 0.649 | | |
| | | | | | | | | 1.213 | |
| D9 |  | ● |  | ● |  | ● | 0.535 | | |
| | | | | | | | | 1.289 | |
| D10 |  | ● | ● | ● |  |  | 0.415 | | |
| REV |  |  | ● | ● | ● |  | -4.475 | - | |

PLANETARY GEAR TRAIN OF AN AUTOMATIC TRANSMISSION FOR A VEHICLE

CROSS-REFERENCE TO RELATED APPLICATION

This application claims priority to and is a division of co-pending U.S. patent application Ser. No. 15/960,135 entitled "Planetary Gear Train of an Automatic Transmission for a Vehicle", filed Apr. 23, 2018, which claims priority to and the benefit of Korean Patent Application No. 10-2017-0143290, filed in the Korean Intellectual Property Office on Oct. 31, 2017. The entire contents of these prior filed applications are incorporated herein by reference.

BACKGROUND

Field of the Disclosure

The present disclosure relates to an automatic transmission for a vehicle.

Description of the Related Art

Research into realizing more shift-stages of an automatic transmission has been undertaken to achieve enhancement of fuel consumption and improve drivability. Increasing oil prices have triggered fierce competition to enhance vehicle fuel consumption.

Therefore, research in the field of engines has been undertaken to achieve weight reduction and to enhance fuel consumption by so-called downsizing. Research in the field of automatic transmissions has also been performed to simultaneously provide better drivability and fuel consumption by achieving more shift stages.

In order to achieve more shift stages for an automatic transmission, the number of parts is typically increased, which may deteriorate installability, production cost, weight and/or power flow efficiency.

Recently, eight-speed automatic transmissions have been introduced. Planetary gear trains for automatic transmissions enabling more shift stages are under investigation.

Conventional automatic transmissions of eight or more shift-stages typically include three to four planetary gear sets and five to seven engagement elements (frictional elements). The transmission may easily become lengthy, thereby deteriorating installability.

In this regard, disposing planetary gear sets in parallel or employing dog clutches instead of wet-type control elements have been attempted. However, such arrangements may not be widely applicable. Using dog clutches may easily deteriorate shift-feel.

The above information disclosed in this Background section is only to enhance understanding of the background of the disclosure. Therefore, the background may contain information that is not prior art that is already known in this country to a person of ordinary skill in the art.

SUMMARY

The present disclosure relates to a planetary gear train of an automatic transmission for a vehicle enabling at least ten forward speeds, thereby providing better performance and fuel efficiency of a vehicle.

A planetary gear train of an automatic transmission for a vehicle may include an input shaft for receiving an input torque, an output shaft for outputting a shifted torque, a first planetary gear set having first, second, and third rotational elements, a second planetary gear set having fourth, fifth, and sixth rotational elements, a third planetary gear set having seventh, eighth, and ninth rotational elements, a fourth planetary gear set having tenth, eleventh, and twelfth rotational elements, a fifth planetary gear set having thirteenth, fourteenth, and fifteenth rotational elements, a first shaft fixedly connected with the second rotational element and the sixth rotational element and fixedly connected with the input shaft, a second shaft fixedly connected with the fourteenth rotational element and fixedly connected with the output shaft, a third shaft fixedly connected with the third rotational element and the fifth rotational element, a fourth shaft fixedly connected with the fourth rotational element and the tenth rotational element, a fifth shaft fixedly connected with the eighth rotational element, the eleventh rotational element, and the fifteenth rotational element, a sixth shaft fixedly connected with the twelfth rotational element, and a plurality of shafts, each of which is selectively connected to the transmission housing and fixedly connected to a rotational element of the first, third, and fifth planetary gear sets that is not fixedly connected with any of the first to sixth shafts.

The plurality of shafts may include a seventh shaft fixedly connected with the first rotational element and the seventh rotational element and selectively connected with the transmission housing, an eighth shaft fixedly connected with the ninth rotational element and selectively connected with the transmission housing, and a ninth shaft fixedly connected with the thirteenth rotational element and selectively connected with the transmission housing. The second shaft and the third shaft, the fifth shaft and the sixth shaft, and the sixth shaft and the ninth shaft may be selectively connected with each other, respectively.

The planetary gear train may further include three clutches and three brakes. Each clutch may be selectively connected with a corresponding pair among the input shaft, the output shaft, and the first to ninth shafts. Each brake may be selectively connected with the seventh shaft, the eighth shaft, and the ninth shaft to the transmission housing, respectively.

The three clutches may include a first clutch arranged between the second shaft and the third shaft, a second clutch arranged between the fifth shaft and the sixth shaft, and a third clutch arranged between the sixth shaft and the ninth shaft. The three brakes may include a first brake arranged between the seventh shaft and the transmission housing, a second brake arranged between the eighth shaft and the transmission housing, and a third brake arranged between the ninth shaft and the transmission housing.

The plurality of shafts may include a seventh shaft fixedly connected with the first rotational element and the seventh rotational element and selectively connected with the transmission housing, an eighth shaft fixedly connected with the ninth rotational element and selectively connected with the transmission housing, and a ninth shaft fixedly connected with the thirteenth rotational element and selectively connected with the transmission housing. The second shaft and the third shaft, the fourth shaft and the fifth shaft, and the sixth shaft and the ninth shaft may be selectively connected with each other, respectively.

The planetary gear train may further include three clutches and three brakes. Each clutch may be selectively connected with a corresponding pair among the input shaft, the output shaft, and the first to ninth shafts. Each brake may be selectively connected with the seventh shaft, the eighth shaft, and the ninth shaft to the transmission housing, respectively.

The three clutches may include a first clutch arranged between the second shaft and the third shaft, a second clutch arranged between the fourth shaft and the fifth shaft, and a third clutch arranged between the sixth shaft and the ninth shaft. The three brakes may include a first brake arranged between the seventh shaft and the transmission housing, a second brake arranged between the eighth shaft and the transmission housing, and a third brake arranged between the ninth shaft and the transmission housing.

The first planetary gear set may be a single pinion planetary gear set having a first sun gear, a first planet carrier, and a first ring gear as the first, second, and third rotational elements, respectively. The second planetary gear set may be a single pinion planetary gear set having a second sun gear, a second planet carrier, and a second ring gear as the fourth, fifth, and sixth rotational elements, respectively. The third planetary gear set may be a single pinion planetary gear set having a third sun gear, a third planet carrier, and a third ring gear as the seventh, eighth, and ninth rotational elements, respectively. The fourth planetary gear set may be a single pinion planetary gear set having a fourth sun gear, a fourth planet carrier, and a fourth ring gear as the tenth, eleventh, and twelfth rotational elements, respectively. The fifth planetary gear set may be a single pinion planetary gear set having a fifth sun gear, a fifth planet carrier, and a fifth ring gear as the thirteenth, fourteenth, and fifteenth rotational elements, respectively.

The first, second, third, fourth, and fifth planetary gear sets may be disposed in the order of the second, first, third, fourth, and fifth planetary gear sets from an input side.

A planetary gear train according to an embodiment of the present disclosure may realize ten forward speeds and one reverse speed by operating five planetary gear sets by controlling six engagement elements.

A planetary gear train according to an embodiment of the present disclosure realizes shifting by controlling five planetary gear sets by six engagement elements, achieves uniform torque load over clutches and brakes, and minimizes torque load applied to the respective shafts connection with the rotational elements, thereby enhancing durability and efficiency.

In addition, a minimal number of engagement elements are controlled to realize shifting between shift-stages of ten forward speeds and one reverse speed. Accordingly, reduction of clutch drag, enhancement of torque transmission efficiency, and enhancement of flexibility of output gear ratios are achieved, thereby enhancing linearity of step ratios.

In addition, a gear ratio span may be increased to above 10.0 while realizing ten forward speeds and one reverse speed, thereby maximizing engine power performance and fuel economy.

In addition, a planetary gear train according to an embodiment of the present disclosure may substantially improve driving stability by realizing shift-stages appropriate for rotational speed of an engine due to the multi-stages of an automatic transmission.

Further, effects that can be obtained or expected from embodiments of the present disclosure are directly or suggestively described in the following detailed description. In other words, various effects expected from embodiments of the present disclosure are described in the following detailed description.

BRIEF DESCRIPTION OF THE DRAWINGS

FIG. 2 is an operational chart for respective control elements at respective shift-stages applicable to a planetary gear train according to a first embodiment of the present disclosure.

DETAILED DESCRIPTION OF THE EMBODIMENTS

Figure 1:
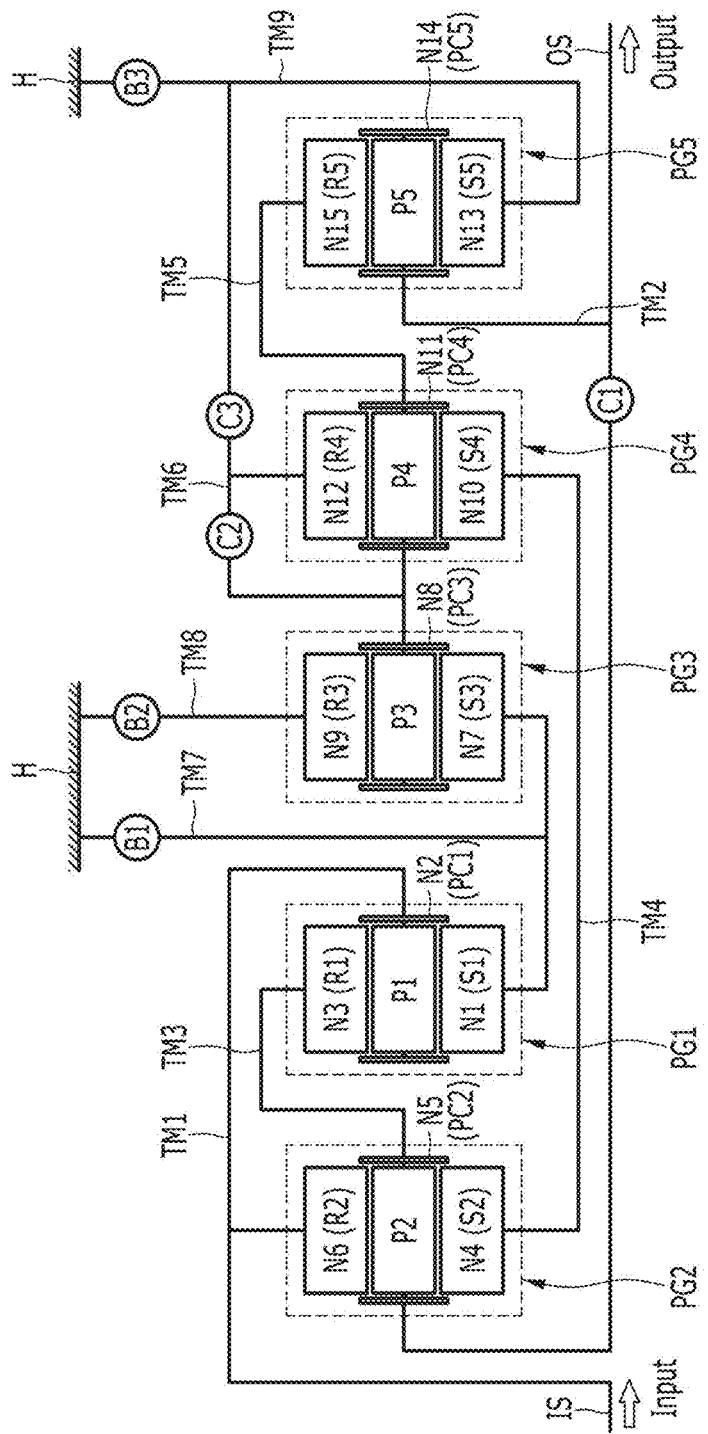
FIG. 1 is a schematic diagram of a planetary gear train according to a first embodiment of the present disclosure.

It is desired to develop a planetary gear train having advantages of realizing, by minimal complexity, at least ten forward speeds and at least one reverse speed. In this aspect, the present disclosure relates to a planetary gear train of an automatic transmission for a vehicle. The disclosed planetary gear train may improve power delivery performance and fuel consumption of an engine by using a smaller number of parts and by increasing a gear ratio span. The disclosed planetary gear train may also achieve linearity of shift stage step ratios.

Hereinafter, an embodiment of the present disclosure will be described in detail with reference to the drawings. In the drawings, the following symbols are used to identify various elements of the disclosed embodiments, wherein;

i. B1, B2, B3 represent first, second, and third brakes;
  ii. C1, C2, C3 represent first, second, and third clutches;
  iii. PG1, PG2, PG3, PG4, PG5 represent first, second, third, fourth, and fifth planetary gear sets;
  iv. S1, S2, S3, S4, S5 represent first, second, third, fourth, and fifth sun gears;
  v. PC1, PC2, PC3, PC4, PC5 represent first, second, third, fourth, and fifth planet carriers;
  vi. R1, R2, R3, R4, R5 represent first, second, third, fourth, and fifth ring gears;
  vii. P1, P2, P3, P4, P5 represent first, second, third, fourth, and fifth pinion gears;
  viii. IS represents an input shaft;
  ix. OS represents an output shaft; and
  x. TM1, TM2, TM3, TM4, TM5, TM6, TM7, TM8, TM9 represent first, second, third, fourth, fifth, sixth, seventh, eighth, and ninth shafts.

The drawings and description are to be regarded as illustrative in nature and not restrictive. Like reference numerals designate like elements throughout the specification.

In the following description, using names or terms to identify components such as first, second, third, and the like is to differentiate the names because the names of the components are otherwise the same as each other. Such a naming convention is not intended to denote or set an order thereof, and the disclosure is not intended to be so limited.

FIG. 1 is a schematic diagram of a planetary gear train according to one embodiment of the present disclosure.

Referring to FIG. 1, a planetary gear train according to a first embodiment of the present disclosure includes first, second, third, fourth, and fifth planetary gear sets PG1, PG2, PG3, PG4, and PG5 arranged on a same axis. In one embodiment, the planetary gear train also includes an input shaft IS, an output shaft OS, nine shafts TM1-TM9 interconnecting rotational elements of the first, second, third, fourth, and fifth planetary gear sets PG1, PG2, PG3, PG4, and PG5, engagement elements of three clutches C1-C3 and three brakes B1-B3, and a transmission housing H.

Torque input from the input shaft IS is shifted by cooperative operation of the first, second, third, fourth, and fifth planetary gear sets PG1, PG2, PG3, PG4, and PG5 and output through the output shaft OS.

In this embodiment of the present disclosure, the planetary gear sets are arranged in the order of the first, second, third, fourth, and fifth planetary gear sets PG1, PG2, PG3, PG4, and PG5, from an engine side.

The input shaft IS is an input member. The input shaft IS may receive a torque from a crankshaft of an engine through a torque converter.

The output shaft OS is an output member. The output shaft OS is arranged on the same axis as the input shaft IS and outputs a shifted driving torque to a driveshaft through a differential apparatus.

In this embodiment, the first planetary gear set PG1 is a single pinion planetary gear set. The first planetary gear set PG1 includes a first sun gear S1, a first planet carrier PC1 rotatably supporting a plurality of first pinion gears P1 externally gear-meshed with the first sun gear S1, and a first ring gear R1 internally gear-meshed with the plurality of first pinion gears P1. The first sun gear S1 acts as a first rotational element N1, the first planet carrier PC1 acts as a second rotational element N2, and the first ring gear R1 acts as a third rotational element N3.

In this embodiment, the second planetary gear set PG2 is a single pinion planetary gear set. The second planetary gear set PG2 includes a second sun gear S2, a second planet carrier PC2 rotatably supporting a plurality of second pinion gears P2 externally gear-meshed with the second sun gear S2, and a second ring gear R2 internally gear-meshed with the plurality of second pinion gears P2. The second sun gear S2 acts as a fourth rotational element N4, the second planet carrier PC2 acts as a fifth rotational element N5, and the second ring gear R2 acts as a sixth rotational element N6.

In this embodiment, the third planetary gear set PG3 is a single pinion planetary gear set. The third planetary gear set PG3 includes a third sun gear S3, a third planet carrier PC3 rotatably supporting a plurality of third pinion gears P3 externally gear-meshed with the third sun gear S3, and a third ring gear R3 internally gear-meshed with the plurality of third pinion gears P3. The third sun gear S3 acts as a seventh rotational element N7, the third planet carrier PC3 acts as an eighth rotational element N8, and the third ring gear R3 acts as a ninth rotational element N9.

In this embodiment, the fourth planetary gear set PG4 is a single pinion planetary gear set. The fourth planetary gear set PG4 includes fourth sun gear S4, a fourth planet carrier PC4 rotatably supporting a plurality of fourth pinion gears P4 externally gear-meshed with the fourth sun gear S4, and a fourth ring gear R4 internally gear-meshed with the plurality of fourth pinion gears P4. The fourth sun gear acts as a tenth rotational element N10, the fourth planet carrier PC4 acts as an eleventh rotational element N11, and the fourth ring gear R4 acts as a twelfth rotational element N12.

In this embodiment, the fifth planetary gear set PG5 is a single pinion planetary gear set. The fifth planetary gear set PG5 includes a fifth sun gear S5, a fifth planet carrier PC5 rotatably supporting a plurality of fifth pinion gears P5 externally gear-meshed with the fifth sun gear S5, and a fifth ring gear R5 internally gear-meshed with the plurality of fifth pinion gears P5. The fifth sun gear S5 acts as a thirteenth rotational element N13, the fifth planet carrier PC5 acts as a fourteenth rotational element N14, and the fifth ring gear R5 acts as a fifteenth rotational element N15.

In this embodiment of the arrangement of the first, second, third, fourth, and fifth planetary gear sets PG1, PG2, PG3, PG4, and PG5, the first rotational element N1 is fixedly connected with the seventh rotational element N7. The second rotational element N2 is fixedly connected with the sixth rotational element N6. The third rotational element N3 is fixedly connected with the fifth rotational element N5. The fourth rotational element N4 is fixedly connected with the tenth rotational element N10. The eighth rotational element N8 is fixedly connected with the eleventh rotational element N11 and the fifteenth rotational element N15 by nine shafts TM1-TM9.

The nine shafts TM1-TM9 are hereinafter described in detail.

In this embodiment, the first shaft TM1 is fixedly connected with the second rotational element N2 (first planet carrier PC1) and sixth rotational element N6 (second ring gear R2). The first shaft TM1 is also fixedly connected with the input shaft IS, thereby always acting as an input element.

In this embodiment, the second shaft TM2 is fixedly connected with the fourteenth rotational element N14 (fifth planet carrier PC5). The second shaft TM2 is also fixedly connected with the output shaft OS, thereby always acting as an output element.

In this embodiment, the third shaft TM3 is fixedly connected with the third rotational element N3 (first ring gear R1) and fifth rotational element N5 (second planet carrier PC2).

In this embodiment, the fourth shaft TM4 is fixedly connected with the fourth rotational element N4 (second sun gear S2) and tenth rotational element N10 (fourth sun gear S4).

In this embodiment, the fifth shaft TM5 is fixedly connected with the eighth rotational element N8 (third planet carrier PC3), eleventh rotational element N11 (fourth planet carrier PC4), and fifteenth rotational element N15 (fifth ring gear R5).

In this embodiment, the sixth shaft TM6 is fixedly connected with the twelfth rotational element N12 (fourth ring gear R4).

In this embodiment, the seventh shaft TM7 is fixedly connected with the first rotational element N1 (first sun gear S1) and seventh rotational element N7 (third sun gear S3).

In this embodiment, the eighth shaft TM8 is fixedly connected with the ninth rotational element N9 (third ring gear R3).

In this embodiment, the ninth shaft TM9 is fixedly connected with the thirteenth rotational element N13 (fifth sun gear S5).

Each of the nine shafts, TM1-TM9, may be a rotational member that fixedly interconnects the input and output shafts and the rotational elements of the planetary gear sets PG1, PG2, PG3, PG4, and PG5. Each of the nine shafts may be a rotational member that selectively interconnects a rotational element to the transmission housing H. Each of the nine shafts may also be a fixed member fixed to the transmission housing H.

In the disclosure, the fixedly connected members always rotate at a same speed when two or more members are described to be "fixedly connected", where each of the members may be any of a shaft, an input shaft, an output shaft, a rotational member, and a transmission housing.

When two or more members are described to be "selectively connected" by an engagement element, the selectively connected members rotate separately when the engagement element is not engaged and rotate at a same speed when the engagement element is engaged. It may be understood that in the case that a member is "selectively connected" with a transmission housing by an engagement element, the member may be stationary when the engagement element is engaged.

In this embodiment, the first shaft TM1 is fixedly connected with the input shaft IS, the second shaft TM2 is selectively connected with the third shaft TM3, the fifth shaft TM5 is selectively connected with the sixth shaft TM6, and the sixth shaft TM6 is selectively connected with the ninth shaft TM9.

The seventh shaft TM7, the eighth shaft TM8, and the ninth shaft TM9 are selectively connected with the transmission housing H, thereby selectively acting as a fixed element, respectively.

In this embodiment, the engagement elements of three clutches C1, C2, and C3 are arranged between the nine shafts TM1-TM9, the input shaft IS, and the output shaft OS, thereby forming selective connections.

In this embodiment, the nine shafts TM1-TM9 may be selectively connected with the transmission housing H by control elements of three brakes B1, B2, and B3.

In this embodiment, each of the six engagement elements of the three clutches C1-C3 and the three brakes B1-B3 are arranged as follows.

The first clutch C1 is arranged between the second shaft TM2 and the third shaft TM3. The first clutch C1 selectively connects the second shaft TM2 and the third shaft TM3, thereby controlling power delivery therebetween.

The second clutch C2 is arranged between the fifth shaft TM5 and the sixth shaft TM6. The second clutch C2 selectively connects the fifth shaft TM5 and the sixth shaft TM6, thereby controlling power delivery therebetween.

The third clutch C3 is arranged between the sixth shaft TM6 and the ninth shaft TM9. The third clutch C3 selectively connects the sixth shaft TM6 and the ninth shaft TM9, thereby controlling power delivery therebetween.

The first brake B1 is arranged between the seventh shaft TM7 and the transmission housing H. The first brake B1 selectively connects the seventh shaft TM7 to the transmission housing H.

The second brake B2 is arranged between the eighth shaft TM8 and the transmission housing H, The second brake B2 selectively connects the eighth shaft TM8 to the transmission housing H.

The third brake B3 is arranged between the ninth shaft TM9 and the transmission housing H. The third brake B3 selectively connects the ninth shaft TM9 to the transmission housing H.

In this embodiment, the engagement elements of the first, second, and third clutches C1, C2, and C3 and the first, second, and third brakes B1, B2, and B3 may be realized as multi-plate hydraulic pressure friction devices that are frictionally engaged by hydraulic pressure. However, it should not be understood to be limited thereto, since various other configurations that are electrically controllable may be available.

FIG. 2 is an operational chart for the respective control elements at respective shift-stages applicable to a planetary gear train according to a first embodiment of the present disclosure.

Referring to FIG. 2, a planetary gear train according to a first embodiment of the present disclosure realizes shifting between ten forward speeds and one reverse speed by operating three elements among the engagement elements of the first, second, and third clutches C1, C2, and C3 and the first, second, and third brakes B1, B2, and B3.

In this embodiment, the third clutch C3 and the second and third brakes B2 and B3 are simultaneously operated in the forward first speed D1.

As a result, the first shaft TM1 always receives an input torque by being fixedly connected with the input shaft IS, and the sixth shaft TM6 is connected with the ninth shaft TM9 by the operation of the third clutch C3.

In addition, the eighth and ninth shafts TM8 and TM9, respectively, act as fixed elements by the operation of the second and third brakes B2 and B3, thereby realizing the forward first speed and outputting a shifted torque to the output shaft OS connected with the second shaft TM2.

In this embodiment, the second clutch C2 and the second and third brakes B2 and B3 are simultaneously operated in the forward second speed D2.

As a result, the first shaft TM1 always receives an input torque by being fixedly connected with the input shaft IS, and the fifth shaft TM8 is connected with the sixth shaft TM6 by the operation of the second clutch C2.

In addition, the eighth and ninth shafts TM8 and TM9, respectively, act as fixed elements by the operation of the second and third brakes B2 and B3, thereby realizing the forward second speed and outputting a shifted torque to the output shaft OS connected with the second shaft TM2.

In this embodiment, the first clutch C1 and the second and third brakes B2 and B3 are simultaneously operated in the forward third speed D3.

As a result, the first shaft TM1 always receives an input torque by being fixedly connected with the input shaft IS, and the second shaft TM2 is connected with the third shaft TM3 by the operation of the first clutch C1.

In addition, the eighth and ninth shafts TM8 and TM9, respectively, act as fixed elements by the operation of the second and third brakes B2 and 63, thereby realizing the forward third speed and outputting a shifted torque to the output shaft OS connected with the second shaft TM2.

In this embodiment, the first and third clutches C1 and C3 and the second brake B2 are simultaneously operated in the forward fourth speed D4.

As a result, the first shaft TM1 always receives an input torque by being fixedly connected with the input shaft IS, the second shaft TM2 is connected with the third shaft TM3 by the operation of the first clutch C1, and the sixth shaft TM6 is connected with the ninth shaft TM9 by the operation of the third clutch C3.

In addition, the eighth shaft TM8 acts as a fixed element by the operation of the second brake B2, thereby realizing the forward fourth speed and outputting a shifted torque to the output shaft OS connected with the second shaft TM2.

In this embodiment, the first and second clutch C1 and C2 and the second brake B2 are simultaneously operated in the forward fifth speed C5.

As a result, the first shaft TM1 always receives an input torque by being fixedly connected with the input shaft IS, the second shaft TM2 is connected with the third shaft TM3 by the operation of the first clutch C1, and the fifth shaft TM5 is connected with the sixth shaft TM6 by the operation of the second clutch C2.

In addition, the eighth shaft TM8 acts as a fixed element by the operation of the second brake B2, thereby realizing the forward fifth speed and outputting a shifted torque to the output shaft OS connected with the second shaft TM2.

In this embodiment, the first, second, and third clutches C1, C2, and C3 are simultaneously operated in the forward sixth speed D6.

As a result, the first shaft TM1 always receives an input torque by being fixedly connected with the input shaft IS, the second shaft TM2 is connected with the third shaft TM3 by the operation of the first clutch C1, the fifth shaft TM5 is connected with the sixth shaft TM6 by the operation of the second clutch C2, and the sixth shaft TM6 is connected with the ninth shaft TM9 by the operation of the third clutch C3.

Accordingly, the first, second, third, fourth, and fifth planetary gear sets PG1, PG2, PG3, PG4, and PG5 integrally rotate, thereby realizing the sixth speed where a torque is output as inputted and outputting a shifted torque to the output shaft OS connected with the second shaft TM2.

In this embodiment, the first and second clutch C1 and C2 and the third brake B3 are simultaneously operated in the forward seventh speed D7.

As a result, the first shaft TM1 always receives an input torque by being fixedly connected with the input shaft IS, the second shaft TM2 is connected with the third shaft TM3 by the operation of the first clutch C1, and the fifth shaft TM5 is connected with the sixth shaft TM6 by the operation of the second clutch C2.

In addition, the ninth shaft TM9 acts as a fixed element by the operation of the third brake B3, thereby realizing the forward seventh speed and outputting a shifted torque to the output shaft OS connected with the second shaft TM2.

In this embodiment, the first and second clutch C1 and C2 and the first brake B1 are simultaneously operated in the forward eighth speed D8.

As a result, the first shaft TM1 always receives an input torque by being fixedly connected with the input shaft IS, the second shaft TM2 is connected with the third shaft TM3 by the operation of the first clutch C1, and the fifth shaft TM5 is connected with the sixth shaft TM6 by the operation of the second clutch C2.

In addition, the seventh shaft TM7 acts as a fixed element by the operation of the first brake B1, thereby realizing the forward eighth speed and outputting a shifted torque to the output shaft OS connected with the second shaft TM2.

In this embodiment, the second clutch C2 and the first and third brakes B1 and B3 are simultaneously operated in the forward ninth speed D9.

As a result, the first shaft TM1 always receives an input torque by being fixedly connected with the input shaft IS, and the fifth shaft TM5 is connected with the sixth shaft TM6 by the operation of the second clutch C2.

In addition, the seventh and ninth shafts TM7 and TM9 act as fixed elements by the operation of the first and third brakes B1 and 133, thereby realizing the forward ninth speed and outputting a shifted torque to the output shaft OS connected with the second shaft TM2.

In this embodiment, the first and second clutch C1 and C2 and the first brake B1 are simultaneously operated in the forward tenth speed C10.

As a result, the first shaft TM1 always receives an input torque by being fixedly connected with the input shaft IS, the fifth shaft TM5 is connected with the sixth shaft TM6 by the operation of the second clutch C2, and the sixth shaft TM6 is connected with the ninth shaft TM9 by the operation of the third clutch C3.

In addition, the seventh shaft TM7 acts as a fixed element by the operation of the first brake B1, thereby realizing the forward tenth speed and outputting a shifted torque to the output shaft OS connected with the second shaft TM2.

In the reverse speed REV, the third clutch C3 and the first and second brakes B1 and B2 are simultaneously operated.

As a result, the first shaft TM1 always receives an input torque by being fixedly connected with the input shaft IS, and the sixth shaft TM6 is connected with the ninth shaft TM9 by the operation of the third clutch C3.

In addition, the seventh and eighth shafts TM7 and TM8 act as fixed elements by the operation of the first and second brakes B1 and B2, thereby realizing the reverse speed and outputting a shifted torque to the output shaft OS connected with the second shaft TM2.

Figure 3:
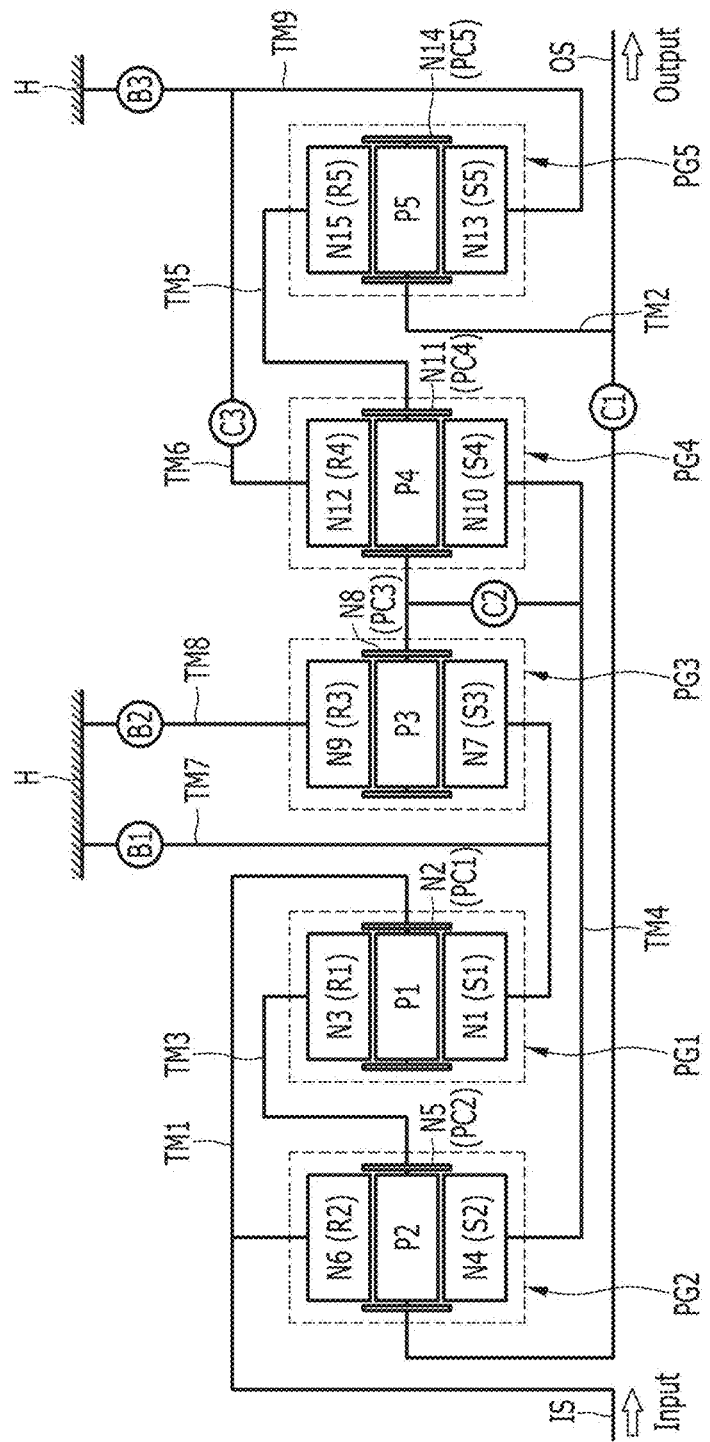
FIG. 3 is a schematic diagram of a planetary gear train according to a second embodiment of the present disclosure.

FIG. 3 is a schematic diagram of a planetary gear train according to a second embodiment of the present disclosure.

According to a planetary gear train according to the first embodiment of the present disclosure shown in FIG. 1, the second clutch C2 for integrally rotating the fourth planetary gear set PG4 is arranged to selectively connect the fifth shaft TM5 and the sixth shaft TM6. However, according to a planetary gear train according to a second embodiment of the present disclosure shown in FIG. 3, the second clutch C2 is arranged to selectively connect the fourth shaft TM4 and the fifth shaft TM5.

Although the planetary gear train according to the second embodiment differs from a planetary gear train according to the first embodiment in regards to the location of the second clutch C2, operations and functions of the planetary gear train remains the same.

As described above, a planetary gear train according to an embodiment of the present disclosure may realize ten forward speeds and one reverse speed by operating five planetary gear sets PG1, PG2, PG3, PG4, and PG5 by controlling three clutches C1, C2, and C3 and three brakes B1, B2, and B3.

A planetary gear train according to an embodiment of the present disclosure realizes shifting by controlling five planetary gear sets PG1, PG2, PG3, PG4, and PG5 by six engagement elements C1, C2, C3, B1, B2, and B3, achieves uniform torque load over clutches and brakes, and minimizes torque load applied to the respective shaft's connection with rotational elements, thereby enhancing durability and efficiency.

In addition, a minimal number of engagement elements are controlled to realize shifting between shift-stages of ten forward speeds and one reverse speed. Accordingly, reduction of clutch drag, enhancement of torque transmission efficiency, and enhancement of flexibility of output gear ratios are achieved, thereby enhancing linearity of step ratios.

In addition, a gear ratio span may be increased to above 10.0 while realizing ten forward speeds and one reverse speed, thereby maximizing engine power performance and fuel economy.

In addition, a large number of shift-stages are realized. Accordingly, an engine speed may be maintained at a low speed by enabling an optimal shift-stage, thereby improving N.V.H. characteristics of a vehicle.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

What is claimed is:

1. A planetary gear train of an automatic transmission for a vehicle, the planetary gear train comprising:
   an input shaft for receiving an input torque;
   an output shaft for outputting a shifted torque;
   a first planetary gear set having a first; a second, and a third rotational element;
   a second planetary gear set having a fourth, a fifth, and a sixth rotational element;

a third planetary gear set having a seventh, an eighth, and a ninth rotational element;
a fourth planetary gear set having a tenth; an eleventh, and a twelfth rotational element;
a fifth planetary gear set having a thirteenth, a fourteenth, and a fifteenth rotational element;
a first shaft fixedly connected with the second rotational element and the sixth rotational element and fixedly connected with the input shaft;
a second shaft fixedly connected with the fourteenth rotational element and fixedly connected with the output shaft;
a third shaft fixedly connected with the third rotational element and the fifth rotational element;
a fourth shaft fixedly connected with the fourth rotational element and the tenth rotational element;
a fifth shaft fixedly connected with the eighth rotational element, the eleventh rotational element, and the fifteenth rotational element;
a sixth shaft fixedly connected with the twelfth rotational element; and
a plurality of shafts, each of which is selectively connected to a transmission housing and fixedly connected to a rotational element of the first, third, and fifth planetary gear sets that is not fixedly connected with any of the first to sixth shafts,
wherein the plurality of shafts includes
a seventh shaft fixedly connected with the first rotational element and the seventh rotational element and selectively connected with the transmission housing;
an eighth shaft fixedly connected with the ninth rotational element and selectively connected with the transmission housing; and
a ninth shaft fixedly connected with the thirteenth rotational element and selectively connected with the transmission housing, and
wherein the second shaft and the third shaft, the fourth shaft and the fifth shaft, and the sixth shaft and the ninth shaft are selectively connected with each other, respectively.

2. The planetary gear train of claim 1, further comprising:
three clutches; and
three brakes each selectively connecting the seventh shaft, the eighth shaft, and the ninth shaft to the transmission housing, respectively.

3. The planetary gear train of claim 2, wherein the three clutches comprise:
a first clutch arranged between the second shaft and the third shaft;
a second clutch arranged between the fourth shaft and the fifth shaft; and
a third clutch arranged between the sixth shaft and the ninth shaft, and
wherein the three brakes comprise:
a first brake arranged between the seventh shaft and the transmission housing;
a second brake arranged between the eighth shaft and the transmission housing; and
a third brake arranged between the ninth shaft and the transmission housing.

4. A planetary gear train of an automatic transmission for a vehicle, the planetary gear train comprising:
an input shaft for receiving an input torque;
an output shaft for outputting a shifted torque;
a first planetary gear set having a first, a second, and a third rotational element;
a second planetary gear set having a fourth, a fifth, and a sixth rotational element;
a third planetary gear set having a seventh, an eighth, and a ninth rotational element;
a fourth planetary gear set having a tenth, an eleventh, and a twelfth rotational element; and
a fifth planetary gear set having a thirteenth, a fourteenth, and a fifteenth rotational element,
wherein the first rotational element is fixedly connected with the seventh rotational element and selectively connected with a transmission housing,
wherein the second rotational element is fixedly connected with the sixth rotational element and fixedly connected with the input shaft,
wherein the third rotational element is fixedly connected with the fifth rotational element,
wherein the fourth rotational element is fixedly connected with the tenth rotational element,
wherein the eighth rotational element is fixedly connected with the eleventh rotational element and the fifteenth rotational element,
wherein the ninth rotational element is selectively connected with the transmission housing,
wherein the eleventh rotational element is selectively connected with the tenth rotational element,
wherein the thirteenth rotational element is selectively connected with the twelfth rotational element and selectively connected with the transmission housing, and
wherein the fourteenth rotational element is fixedly connected with the output shaft, and selectively connected with the fifth rotational element.

5. The planetary gear train of claim 4, further comprising:
three clutches each selectively connecting a corresponding pair of the rotational elements; and
three brakes each selectively connecting the first rotational element, the ninth rotational element, and the thirteenth rotational element to the transmission housing, respectively.

6. The planetary gear train of claim 5; wherein the three clutches comprise:
a first clutch arranged between the fifth rotational element and the fourteenth rotational element;
a second clutch arranged between the eleventh rotational element and the tenth rotational element; and
a third clutch arranged between the twelfth rotational element and the thirteenth rotational element, and
wherein the three brakes comprise:
a first brake arranged between the first rotational element and the transmission housing;
a second brake arranged between the ninth rotational element and the transmission housing; and
a third brake arranged between the thirteenth rotational element and the transmission housing.

7. The planetary gear train of claim 4, wherein the first planetary gear set is a single pinion planetary gear set having a first sun gear, a first planet carrier, and a first ring gear as the first, second, and third rotational elements, respectively,
wherein the second planetary gear set is a single pinion planetary gear set having a second sun gear, a second planet carrier, and a second ring gear as the fourth, fifth, and sixth rotational elements, respectively,
wherein the third planetary gear set is a single pinion planetary gear set having a third sun gear, a third planet carrier, and a third ring gear as the seventh, eighth, and ninth rotational elements, respectively, wherein the fourth planetary gear set is a single pinion planetary gear set having a fourth sun gear, a fourth planet carrier, and a fourth ring gear as the tenth, eleventh, and twelfth rotational elements, respectively, and wherein the fifth planetary gear set is a single pinion planetary gear set having a fifth sun gear, a fifth planet carrier, and a fifth ring gear as the thirteenth, fourteenth, and fifteenth rotational elements, respectively.

8. The planetary gear train of claim 4, wherein the first, second, third, fourth, and fifth planetary gear sets are arranged in an order of the second, first, third, fourth, and fifth planetary gear sets from an input side.

* * * * *

UNITED STATES PATENT AND TRADEMARK OFFICE
CERTIFICATE OF CORRECTION

PATENT NO. : 10,794,454 B1  
APPLICATION NO. : 16/915112  
DATED : October 6, 2020  
INVENTOR(S) : Kim et al.

Page 1 of 1

It is certified that error appears in the above-identified patent and that said Letters Patent is hereby corrected as shown below:

In the Claims

Claim 1, Column 11, Line 4:
"atwelfth" should be replaced with --a twelfth--

Signed and Sealed this
Seventeenth Day of November, 2020

Andrei Iancu
*Director of the United States Patent and Trademark Office*